(No Model.)
T. B. DENISTON.
TRAWL LINE.
No. 488,874. Patented Dec. 27, 1892.
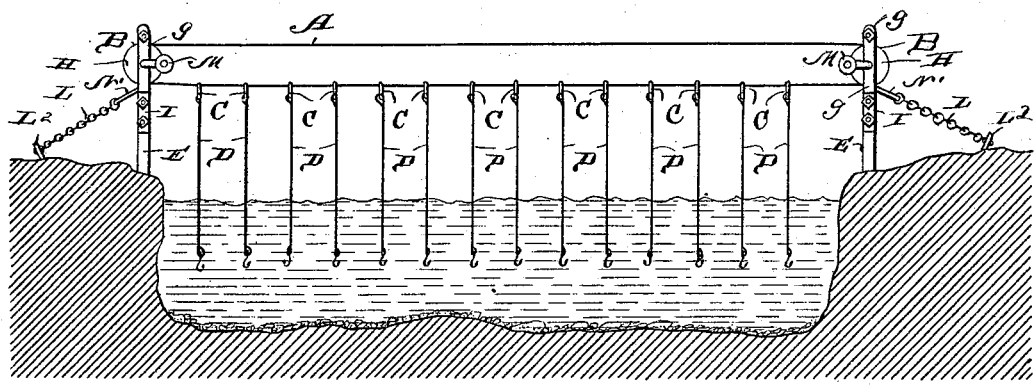
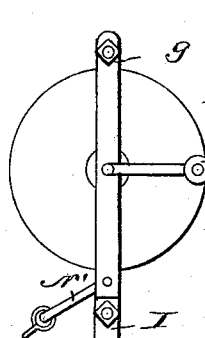 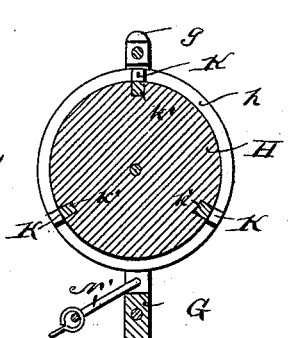 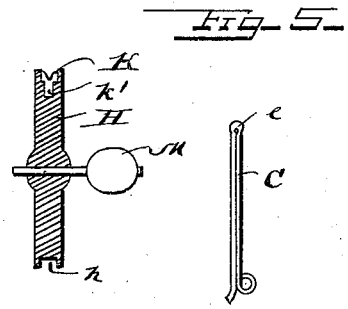
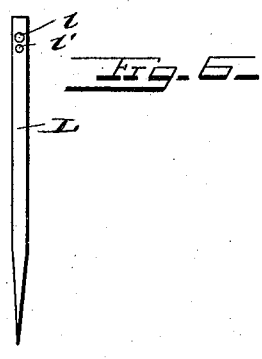
Witnesses
Jesse Heller.
Phil C. Ulasi.
Inventor
Thos. B. Deniston,
by E. W. Anderson.
Attorney

UNITED STATES PATENT OFFICE.

THOMAS BENTON DENISTON, OF PERU, INDIANA.

TRAWL-LINE.

SPECIFICATION forming part of Letters Patent No. 488,874, dated December 27, 1892.

Application filed April 30, 1892. Serial No. 431,255. (No model.)

*To all whom it may concern:*

Be it known that I, THOMAS BENTON DENISTON, a citizen of the United States, and a resident of Peru, in the county of Miami and State of Indiana, have invented certain new and useful Improvements in Trawl-Lines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view of the line extended across stream. Fig. 2 is an enlarged view of the pointed tube and reel. Fig. 3 is a section of same and Figs. 4 5 and 6 are detail views.

This invention has relation to certain new and useful improvements in trawl lines, and it consists in the novel construction and combination of parts, all as hereinafter specified.

The trawl lines ordinarily in use, consist of a single line stretched across a stream or other body of water and made fast at its ends. To this line are rigidly attached a number of short lines to which the hooks are connected, the whole being usually below the surface of the water so that it is impossible to tell from a distance when a fish has been hooked. Accordingly, it is customary to follow along the line with a boat at intervals, each short line being raised and inspected. This operation occasions considerable noise and disturbance of the waters in the vicinity of the line, which causes the fish in the neighborhood to become frightened and leave the spot.

The object of this invention is to provide a line from which the short lines may be easily detached, and as easily replaced, and which may be readily operated from the banks of the stream, or other points where the ends of the line are located.

In the accompanying drawings, the letter A designates a double or continuous line, passing around two reels at B, B, and having its lower portion carrying a set of hooks C, C. These hooks are attached to the ends of short lines D, D, which are at their upper ends provided with hooks E, E, having a sharp bend therein at $e$, which engages the line, the harder the pull, the firmer being the engagement.

The reels B, B, and their supports are preferably each of the following construction: E designates a hollow, metal tube, pointed at its lower end $f$ to enable it to be readily driven in the ground.

G designates the reel carrier, which consists of a bracket having arms $g, g$, between which the reel H is journaled. These arms at their lower portion are secured to a block I having a cylindric portion I', designed to loosely fit in the upper end of the metal tube.

In the peripheral edge of the reel H is formed a continuous groove $h$ for the line, the side flanges of which are upwardly and outwardly beveled as shown. At equi-distant points in this groove are line guides K, consisting each of a piece of metal or other suitable material, in which is formed a U-shaped recess $k$, for the line. Said guides are held in the reel by means of a shank portion $k'$, and are for the purpose of holding the line to the center of the reel. Without these guides, the line would have a tendency to shift to one side or the other, and in rubbing against the side flanges would cause the portion of the line between the reels to twist to such an extent that the short lines would be wound and tangled up and the bait drawn out of the water.

L is a brace for the reel support. This brace consists of a chain or cable connected to the reel stand by means of a V-shaped loop N', the ends of which enter perforations in the lower portions of the arms $g, g$. The opposite end is connected to a flat pointed plate $L^2$, designed to be driven in the ground. In the upper portion of this plate are true holes $l, l'$ the chain being secured in the lower hole $l'$, so that the upper end of the plate may be struck in driving it into the ground without injury to said chain. When transporting or packing, the chain may be detached from the reel support, and placed inside the tube F. The reel support or bracket G is free to rotate in its bearings in the tube F, so that when the line is tightened, the reels may turn into such position that the two will exactly fit each other. A set screw $f^2$ may be provided in order to prevent the handle falling out of the tube while being carried.

M is the operating crank or handle for the reel.

In setting up the line, one of the reel stands is driven in the ground on each side of stream, or other place, near the edge of the water, so that the lower portion of the main line when stretched will be about three or four feet above the water line. The short lines with the hooks are then attached to the main line, which is meanwhile reeled out until the series of hooks extends across the stream, or until as many are put on as is desired. In still fishing, the line may be watched from the banks, it being readily seen when a fish is hooked on any of the short lines. When a fish is hooked on a central short line, or on a line out from the banks, the reel is operated to bring the first hook to shore, its short line being unhooked from the main line, and laid on the bank; likewise the second and succeeding small lines are reeled in and detached from the main line, until the line is reached upon which the fish is hooked. This line is then detached, a new one supplied, and the main lines again reeled out, the short lines being attached at intervals. By means of these reels the line may be also trolled back and forth across the stream.

It is obvious that a single line having the short lines attached thereto and carried by reels, one on each side may be employed, by having a length of extra line on one reel equal to the length of the line.

A great advantage of this device, is that by its use, more large fish may be caught than in any other manner of hook fishing. This is owing to the fact that in trolling the line may be drawn back and forth without noise; and in still fishing, by means of reels, the bait may be moved gently to attract the fish without frightening them, by the noise and movements of the operator, as is the case when a pole and line are used.

If a hook becomes fast it may be easily loosened by turning the reels in the opposite direction to the movement which fastened it.

Having described this invention, what I claim and desire to secure by Letters Patent is:

1. A trawl device, comprising a continuous double line having a series of detachable short lines carrying hooks, in combination with the reel stands and reels for supporting and operating said lines, said reels and stands consisting each of a tube adapted to be driven in the ground and having a socket in its upper portion, a head fitting in said socket, and a reel carried by said head, substantially as specified.

2. In a trawl device, comprising a continuous double line having a series of hooks attached thereto, a reel stand and reel for supporting and operating said line, said stand comprising a tube pointed at its lower end, a head having a cylindric portion fitting in the upper end of said tube, a pair of reel arms secured to said head, and a reel carried between said arms, substantially as specified.

3. In a trawl device, the combination with the lines, of the reel devices carrying said lines, said reel devices comprising each the hollow pointed tube, the bracket having a loose bearing in said tube, the reel carried in said bracket, the line guides in said reel, and the brace or anchor for the support, substantially as specified.

In testimony whereof I affix my signature in presence of two witnesses.

THOMAS BENTON DENISTON.

Witnesses:
JOHN DAY,
JAMES J. KEYES.